April 24, 1928.

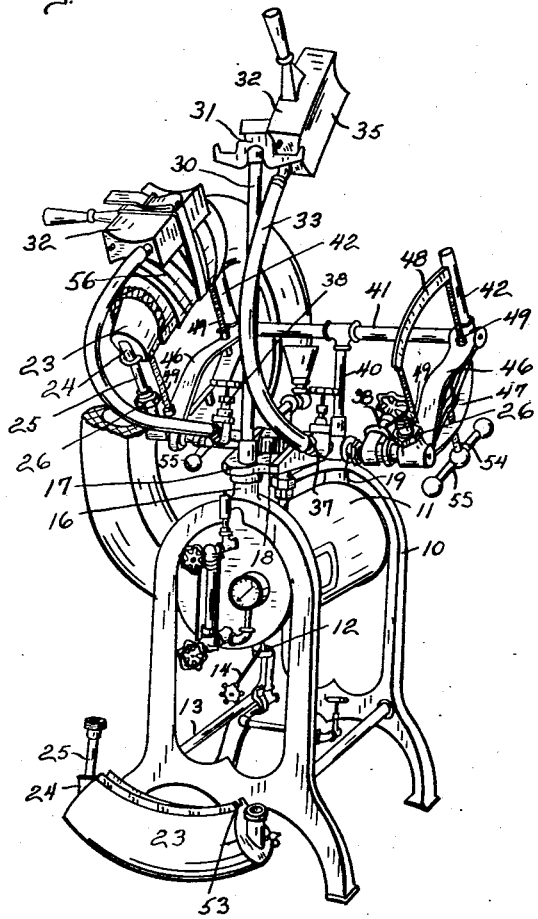

M. E. FABER 1,666,998

REPAIR VULCANIZING APPARATUS

Filed March 13, 1926    2 Sheets-Sheet 2

INVENTOR.
Merle E. Faber
BY
Erwin, Wheeler & Woolard
ATTORNEYS.

Patented Apr. 24, 1928.

1,666,998

UNITED STATES PATENT OFFICE.

MERLE E. FABER, OF WAUPUN, WISCONSIN, ASSIGNOR, BY MESNE ASSIGNMENTS, TO THE SHALER COMPANY, OF WILMINGTON, DELAWARE, A CORPORATION OF DELAWARE.

REPAIR VULCANIZING APPARATUS.

Application filed March 13, 1926. Serial No. 94,444.

My invention relates to improvements in repair vulcanizing apparatus, with particular reference to vulcanizers of the type employed for repairing the outer casing of pneumatic tires. A vulcanizer of the general type to which this invention pertains is disclosed in Letters Patent of the United States to C. A. Shaler, numbered 1,158,315 and dated October 26, 1915.

Objects of this invention are:—to provide means whereby arcuate mandrels of differing diameters may be quickly substituted, one for another, upon a single mounting and connected successively with the same source of heat or of circulatory heating fluid; to provide improved means for applying heat simultaneously to the inner and outer surfaces of tire casings; to provide an improved supporting apparatus adapted to carry a plurality of vulcanizing members conveniently mounted to facilitate vulcanizing operations upon one or more tire casings simultaneously; to provide improved means for distributing clamping pressure upon the side walls of a casing in such a manner as to obtain substantially equal pressure upon all portions thereof, including the rim engaging margins, by means of a tension bar and a strip of tape to be wound about the casing and said bar in a manner similar to that disclosed in said former patent but with greater effectiveness due to the improved construction herein described; to provide means whereby the pressure upon the casing may be resiliently applied; and in general to provide a form of apparatus adapted for the repair of either ordinary or balloon tire casings of various diameters handily, quickly and with good job results.

In the drawings:

Figure 1 is an isometric view of the improved vulcanizing apparatus herein described and claimed, one of the mandrels being detached and illustrated in an inverted position.

Figure 2 is a side elevation of one of the mandrels, together with its associated supporting and tensioning apparatus.

Figure 3 is a cross sectional view of one of the mandrels, with its associated tension bar and filler members, a tensioning wrapper being indicated by dotted lines in position of use when wrapped about a tire casing.

Figure 4 is a view, similar to Figure 2, showing a modified form of construction whereby the wrapping may be placed under resilient tension.

Figure 7 is a detail view of a mandrel adapted for use in vulcanizing balloon tires, which mandrel can be substituted for either of the mandrels shown in Figure 1.

Like parts are identified by the same reference characters throughout the several views.

Figure 5:
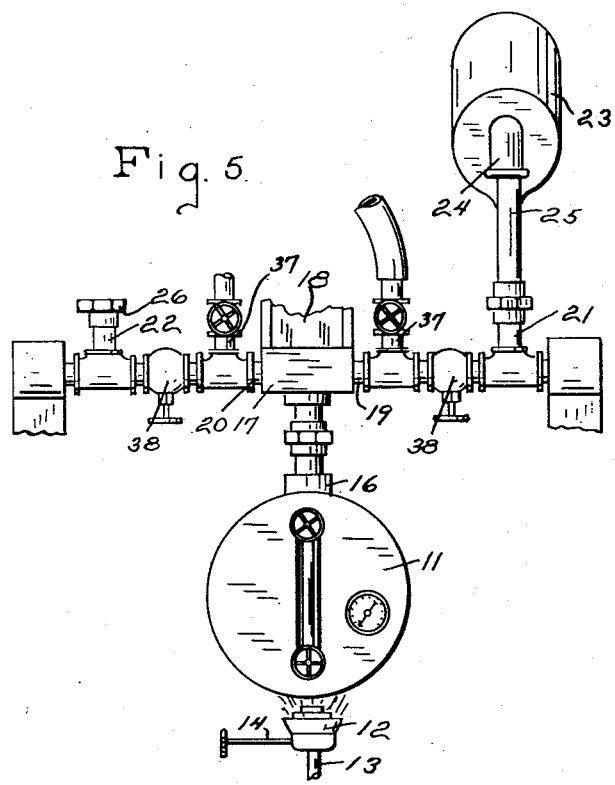
Figure 5 is a diagrammatic view of the heater and circulatory pipe connections.

The frame 10 supports a heater, which, in the construction illustrated, may be assumed to be of an ordinary type having a boiler or reservoir 11 for circulatory fluid, fuel being supplied to a suitable burner 12 through a supply pipe 13, controlled, as to fuel delivery to the burner, by means of the manually actuated valve rod 14. These parts may be of any ordinary construction and further description thereof is deemed unnecessary.

The end members of the frame 10 are provided with top rests 16 connected by an upper frame plate 17, the central portion of which preferably comprises a steam chest 18 from which service pipes 19 and 20 extend laterally to the mandrel supporting supply pipes 21 and 22. Each of the mandrels 23 is arcuate in form and provided with a tubular inlet elbow 24 into which a pipe section 25 is screwed and adapted to be connected by a union coupling 26 with either of the supply pipe sections 21 or 22. Steam, hot water or other heating fluid may thus be delivered to the interior of the mandrel from the boiler 11 through the duct or passage provided by the chest 18 and pipe connections 19 (or 20), 21 (or 22).

The return flow, or liquid of condensation in the case of vapor, may take place through the same duct or passage. At one end of the upper frame plate 17 a post 30 is secured, which carries a bracket 31, adapted to support vulcanizer casings 32, to which the heating fluid may be supplied through the flexible pipe connections 33. These vulcanizer casings 32 have concave surfaces 35 adapted to be applied to the outer surface of a tire casing in order to assist in maintaining a vulcanizing temperature in the portion of the casing to be repaired. The flexible pipes 33 are attached to valved nipples 37, connected with the pipes 19 and 20. Other valves at 38 control delivery to the mandrel supporting pipes 21 and 22.

At the opposite end of the frame plate 17, there is a supporting post 40, to the upper end of which a cross bar or rod 41 is secured. This cross bar 41 carries posts 42 at its outer ends, which are socketed in or otherwise connected with an elbowed projection or socketed fitting 43 at the opposite end of the mandrel from that to which the supply pipes are connected as above described. A set screw 44 may be employed to hold the fitting to the post.

The mandrel is hollow throughout its length, and a pet-cock 45 at its upper end, may be opened to allow the escape of air from the interior of the mandrel when heating fluid is being supplied through the pipes 21, (or 22).

Figure 6:
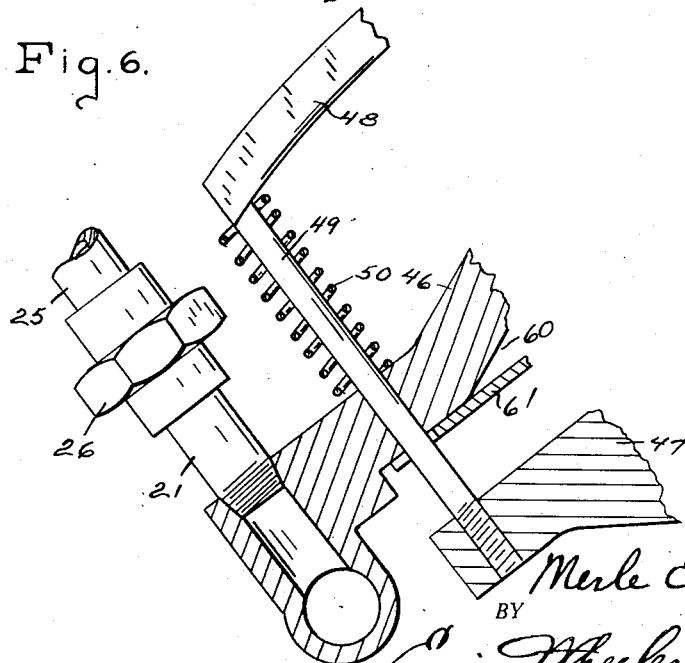
Figure 6 is a detail view, enlarged, showing fragments of the mandrel supporting frame, tension bar, stationary and movable cross heads and associated tension rod.

The cross rod 41 is located at a higher level than the pipes 19 and 20 and co-operates with the pipes in supporting a relatively fixed supporting bar 46 in an inclined position underneath the associated mandrel 23. A relatively movable screw actuated bar 47 is connected with an arcuate tensioning bar 48 by a set of tension rods 49 which pass through end portions of the supporting bar 46. Springs 50, coiled about the rods 49, as best shown in Figure 6, are adapted to support the tension bar and the screw actuated bar 47 and to urge the tension bar in the direction of the mandrel 23, the latter being formed with a channel 53 along its under side to normally receive the tension bar in a position substantially between the rim engaging portions of a tire casing when the latter is applied to the mandrel in a position for a vulcanizing operation. A screw 54 having an operating piece 55 extends through a threaded aperture in the screw actuated bar 47 and its upper end normally bears against the supporting bar 47, which thus serves as an abutment against which the pressure of the screw may be applied.

In the use of the apparatus, a mandrel 23 of the proper size is selected and applied to the supporting post 42 and secured by means of a set screw 44. The other end may then be secured by connecting its pipe section 25 to the associated mandrel supporting supply pipe 21 or 22 by means of the union 26. The casing A to be repaired, and to which a vulcanizable patch has been applied, will then be mounted upon the mandrel with the patch in registry therewith, the tension bar being in its normal position within the channel 53. A strip of tape or band of any suitable flexible material 56 will then be wound about the casing and the tension bar to bind the casing in position upon the mandrel. Packing pieces 58 will preferably be interposed between the tape and the neck portion of the casing,—i. e. the portion which connects the clincher or rim engaging portions with the other portions of the casing. The purpose of these packing pieces 58 is to transmit the pressure of the band to what are herein termed the neck portions of the casing. The relative thickness of the rim engaging portions of the ordinary tire casing are such that the pressure of the band could not otherwise be applied to said neck portions.

After the tape has been wound and secured in wrapping position, the screw 54 may then be turned to draw the bar 47 downwardly and apply the desired tension to the tape or wrapping portion through the associated tension bar 48 as described in said former patent.

If a patch is to be vulcanized on the outer surface of the casing, it is applied thereto and one of the auxiliary vulcanizers 32 is disengaged from the bracket 31 and strapped to the tire casing as illustrated in Figure 1. Thereupon the heating fluid may be delivered from the boiler 11 to the auxiliary vulcanizer and mandrel by opening the valves 37 and 38. The vulcanizing temperature may then be maintained for the desired interval, after which the valves will be closed, the auxiliary vulcanizer removed and the screw 54 turned to releasing position, thus permitting the tape to be unwound and the tire casing removed.

For some purposes it is desirable that the tension be resiliently applied to the bar 48. In such cases I employ the slightly modified form of construction illustrated in Figure 4, wherein the supporting or abutment bar 46 has a recess 60 along its under side, spanned by a resilient bar 61, which serves as the abutment for the end of the screw and which may be slightly recessed or indented at 62 to provide a seating for the screw. This places the screw actuated bar and tension bar under resilient tension when the screw is turned to tensioning position. The abutment bar and actuating bar are preferably trussed bars, whereby the requisite strength is attained with minimum weight.

It will be observed that each mandrel has only one pipe connection, and that such pipe connection comprises two members to be engaged or disengaged by a union coupling. Substitution of mandrels is thus expedited, and as the different mandrels have identical pipe connections they can be interchangeably used without any alteration in the character of the connections. The mandrels are also preferably of the same length to facilitate the connection of their outer or upper ends with the posts 42. By supporting the outer ends at a sufficient height to permit complete drainage through the supply pipes circulation is promoted, and the discharge of water of condensation facilitated when steam is used as the heating medium. The inclination of the mandrels also facilitates the work of mounting tire casings thereon, removing the repaired casings, and applying or removing the auxiliary vulcanizers.

By providing each mandrel with a channel 53 along its under side in which the tension bar 48 may be normally received, it becomes possible to wind the wrapping tape or band about the casing in contact with the inner surfaces of the rim engaging portions and the inner surface of the tension bar, along substantially straight transverse lines. Therefore, when the screw is actuated to draw the tension bar out of its socket the resulting tension of the tape will be applied to the rim engaging portions and associated parts of the tire casing to press them inwardly in the direction of the axis of the casing with a pressure substantially equal to that applied to the outer or tread portions of the casing. This is of particular importance in the repair of balloon tires, which are more subject to rupture along the sides and neck portions than the tires of smaller diameters previously used.

Considerable importance is also attached to the means for supporting the mandrels in a tilted position, the ends which receive the heating fluid being at a sufficiently lower level than the vented ends to allow free drainage of liquid from the hollow interior back to the boiler or reservoir. This not only promotes circulation and allows the mandrel to be heated in all portions to substantially the same temperature as that of the fluid in the upper portion of the boiler, but it also facilitates placing the tire casings on the mandrels, applying patches to their outer surfaces and adjusting the auxiliary vulcanizers thereto.

I claim:

1. In a vulcanizing apparatus, the combination with a source of supply for heated fluid, of a post for interchangeably supporting a set of hollow mandrels in an axially tilted position to drain through one end, a set of hollow mandrels each having an elbowed member at one end adapted for sliding engagement with the end of the post, and a connecting member leading from the source of supply and adapted to be interchangeably coupled to the lower ends of the mandrels for fluid admission and exhaust purposes.

2. In a vulcanizing apparatus, the combination with a source of supply for heated fluid, of a set of posts for each adapted to interchangeably support a set of hollow mandrels in an axially tilted position to drain through one end, a set of hollow mandrels each having a fitting adapted for sliding engagement with the end of the post, and a connecting member leading from the source of supply and adapted to be interchangeably coupled to the lower ends of the mandrels for fluid admission and exhaust purposes, said connecting member forming a portion of the mandrel supporting means.

3. In a vulcanizing apparatus, the combination with an arcuate mandrel adapted to fit the interior of a tire casing and provided with a channel along its shorter arc, and a tension bar normally mounted in said channel and adapted to be withdrawn therefrom against a wrapping member employed to bind a tire casing to the mandrel.

4. In a vulcanizing apparatus having an arcuate hollow mandrel, the combination of a mandrel supporting frame, an arcuate tensioning bar movably supported at both ends from said frame, an abutment bar, an actuating screw bearing against said abutment bar and operatively connected with the tension bar, and resilient means for normally urging the tension bar in the direction of the mandrel.

5. In a vulcanizing apparatus having an arcuate hollow mandrel, the combination of a mandrel supporting frame, an arcuate tensioning bar movably supported in said frame, an abutment bar, an actuating screw bearing against said abutment bar and operatively connected with the tension bar, resilient means for normally urging the tension bar in the direction of the mandrel, and means for resiliently transmitting motion to the tension bar from the screw.

6. In a vulcanizing apparatus, the combination with a supporting frame adapted to hold an arcuate hollow mandrel in an axially tilted position for drainage through one end thereof, a set of hollow mandrels of differing diameters, each adapted to be supported by said frame and each having a channel along its underside, a tension bar resiliently supported by said frame in a normal position of entry in the channel of an associated mandrel, and manually operable means for withdrawing the tension bar from the associated mandrel.

7. In a vulcanizing apparatus, the combination with a supporting frame adapted to hold an arcuate hollow mandrel in an axially tilted position for drainage through one end thereof, a set of hollow mandrels of differing diameters each adapted to be supported by said frame and each having a channel along its underside, a tension bar resiliently supported by said frame in a normal position for entry in the channel of an associated mandrel, and manually operable means for withdrawing the tension bar from the associated mandrel, said manually operable withdrawing means including a resiliently yielding abutment member for the end of the screw.

8. In a vulcanizing apparatus, the combination with a supporting frame provided with a source of supply for heated fluid, of an axially inclined abutment bar, supports extending upwardly therefrom and adapted to carry an arcuate mandrel in a position to receive a tire casing, means for detachably securing the mandrel to said supports, an arcuate tension bar conforming generally to the curvature of the underside of the mandrel, rods extending through said abutment bar and yieldingly supporting the tension bar at its respective ends, an actuating bar connected with said rods and a manually operable screw having threaded bearings therein and adapted to abut the central portion of the abutment bar,—one of the mandrel supports being ported and adapted to convey fluid from the source of supply to the lower end of a mandrel when attached to said supports and the other of said supports being in telescopic connection with the mandrel.

MERLE E. FABER.